United States Patent Office 3,166,577
Patented Jan. 19, 1965

3,166,577
1,2-DIMETHYL ESTROGENS AND INTERMEDI-
ATES USED IN THE PRODUCTION THEREOF
Howard J. Ringold and George Rosenkranz, Mexico City,
Mexico, assignors, by mesne assignments, to Syntex
Corporation, a corporation of Panama
No Drawing. Filed Aug. 9, 1960, Ser. No. 48,352
Claims priority, application Mexico May 29, 1956
20 Claims. (Cl. 260—397.4)

The present invention relates to novel cyclopentano-phenanthrene compounds and to a method for the preparation thereof.

More particularly, the present invention relates to novel 2-methyl and 1,2-dimethyl estrone and estradiol derivatives and to a novel process for the production thereof. The novel compounds of the present invention are estrogenic hormones having reduced estrogenic activity together with valuable anti-androgenic activity; they also lower blood cholesterol levels.

The novel compounds of the present invention are illustrated by the following formulas:

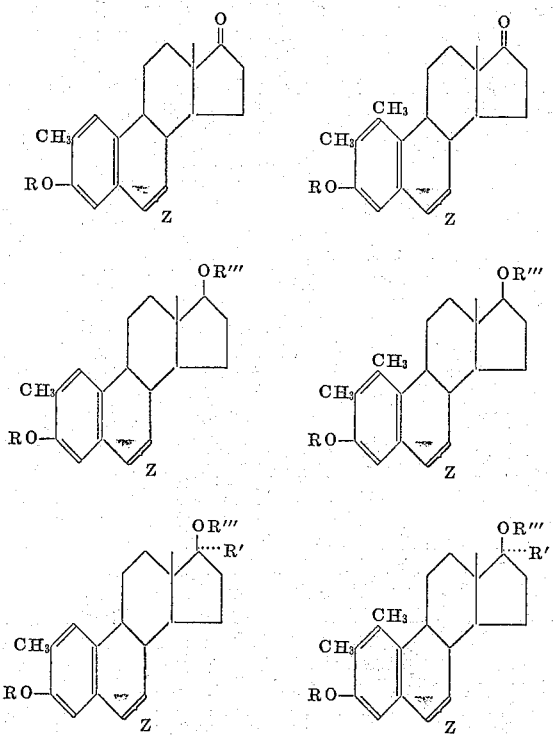

In the above formulas, R and R''' represent hydrogen or an acyl group, saturated or unsaturated, of straight, branched, cyclic or cyclic-aliphatic chain or aromatic. Typical examples of such ester groups are the acetate, propionate, butyrate, caproate, benzoate, cyclopentylpropionate and phenylpropionate. R' represents an aliphatic hydrocarbon group, saturated or unsaturated, of straight or branched chain, containing up to 9 carbon atoms. Typical examples of such hydrocarbon groups are the methyl, ethyl, propyl, vinyl, 3-pentyl, ethinyl, propinyl or methallyl. Z indicates a double bond or a saturated linkage between C-6 and C-7.

In our copending application Serial No. 632,016, filed January 2, 1957, now abandoned, there is disclosed the production of the novel 2α-methyl testosterone. In accordance with the present invention, it has been discovered that this compound upon treatment with an oxidizing agent capable of oxidizing the 17-hydroxyl group to a keto group yields the novel intermediate and androgenic hormone 2α-methyl-Δ⁴-androsten-3,17-dione. Further this last compound upon treatment with approximately 2 mols of bromine vgies the novel intermediate 2α-methyl-2,6-dibromo-Δ⁴-androsten 3,17-dione which yields the novel 2-methyl-Δ¹,⁴,⁶-androstadiene-3,17-dione upon treatment with a dehydrohalogenating agent. Upon further treatment with an acyl anhydride in the presence of p-toluenesulfonic acid the latter compound undergoes rearrangement to give the novel estrogenic hormones and key intermediates, i.e. the lower fatty acid esters of 1,2-dimethyl-6-dehydro estrone, which upon conventional saponification are converted into 1,2-dimethyl-6-dehydro-estrone. Other novel esters of the latter compound are formed by conventional means with hydrocarbon carboxylic acid anhydrides or chlorides containing up to 12 carbon atoms.

Alternatively upon heating the 2-methyl-Δ¹,⁴,⁶-androstatriene-3,17-dione in an organic solvent at about 600° C., aromatization results and there is formed 2-methyl-6-dehydro-estrone which upon conventional esterification with hydrocarbon carboxylic acid anhydrides of the type previously mentioned are converted into the novel esters of 2-methyl-6-dehydro-estrone.

The novel 1,2-dimethyl-6-dehydro-estrone and 2-methyl-6-dehydro-estrone compounds are also useful intermediates for the production of the corresponding estradiol compounds with or without a hydrocarbon substituent at C-17α and with or without a double bond in Ring B at C-6,7.

The following equation illustrates in part a process of the present invention:

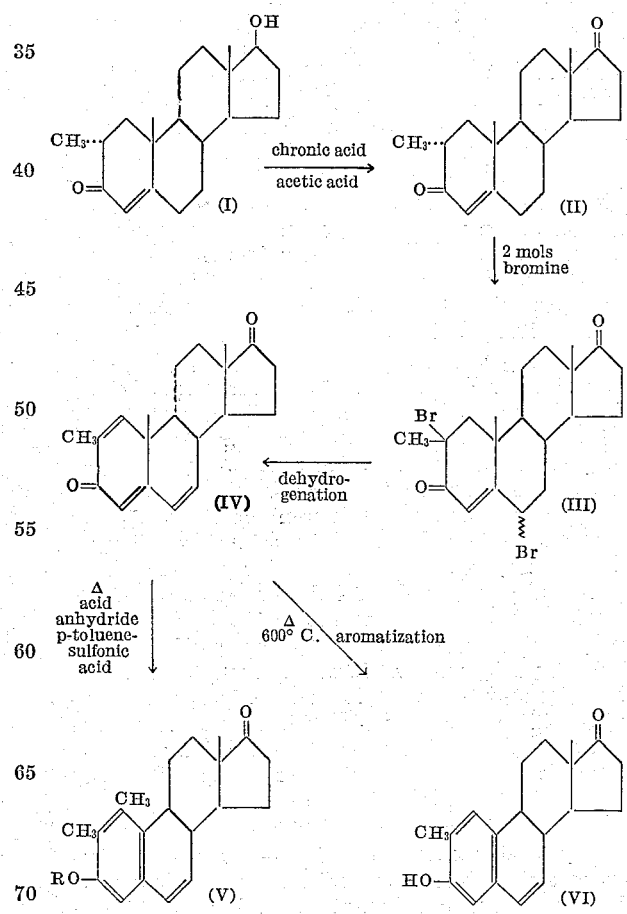

In the above equation R represents hydrogen or an acyl group derived from a hydrocarbon carboxylic acid anhydride.

In practicing the process outlined above, 2α-methyltestosterone (I) is preferably dissolved in glacial acetic acid and the solution cooled below room temperature. Chromic acid (slightly over 1 equivalent) in acetic acid is then added slowly with stirring and while maintaining the reaction mixture below room temperature. The reaction mixture is then allowed to stand for a period of the order of 2 hours at room temperature, poured into ice water and the precipitate of 2α-methyl-Δ⁴-androsten-3,17-dione (II) was collected and purified as by crystallization from an alcoholic solvent. For the next step of the process outlined above the product of the first step was suspended in an organic solvent such as ether to which a catalytic amount of hydrogen bromide in acetic acid was added. To this suspension there was slowly added slightly over 2 mols of bromine in acetic acid. The resulting clear solution was then allowed to stand for one hour and then concentrated under reduced pressure until crystallization of the 2,6-dibromo-2α-methyl-Δ⁴-androsten-3,17-dione (III). The crystals were then filtered and washed with a small amount of ether and consisted of a mixture of both the 6α and 6β bromo isomers.

As indicated in the equation the 2,6-dibromo compound upon treatment with a dehydrohalogenating agent gave as a product 2-methyl-Δ$^{1,4,6}$-androstatrien-3,17-dione (IV). As a suitable dehydrohalogenating agent a tertiary amine such as collidine under reflux was used. Preferably the dibromo compound was refluxed with the collidine for a short period of the order of 1 hour and then cooled. The product was separated from the collidine hydrobromide and purified to give 2-methyl-Δ$^{1,4,6}$-androstatrien-3,17-dione. This product upon treatment with a lower fatty acid anhydride, such as acetic or propionic anhydride and p-toluenesulfonic acid, as by heating on a steam bath for a few hours, rearranged to form the corresponding 3-lower fatty acid ester of 1,2-dimethyl-6-dehydro-estrone (V). Conventional saponification of these compounds as with methanolic alkali metal hydroxide or with an acid, gave the free 1,2-dimethyl-6-dehydro-estrone. From the free compound by conventional acylation procedures such as reaction with corresponding acid anhydrides or acyl halides there were then prepared other esters especially those of hydrocarbon carboxylic acids of less than 12 carbon atoms such as those previously set forth.

By passing a dilute solution as, for example, 1–2% by weight of 2-methyl-Δ$^{1,4,6}$-androstatriene-3,17-dione (IV) through a tube or column filled with glass helices and heated to a temperature of for example 600° C. and preferably between 500° and 650°, there was prepared the 2-methyl-6-dehydro-estrone (VI). The solvents used are preferably hydrogen donor solvents such as tetralin, mineral oil, dihydronaphthalene, dihydrophenanthrene, cyclohexene etc. After passage through the tube the hot reaction solution was diluted with an organic solvent such as hexane and the product [(2-methyl-6-dehydro-estrone) (VI)] was purified as by chromatography and crystallization. From the free compound by conventional acylation procedures such as reaction with the corresponding acid anhydrides or acyl halides there were then prepared esters of hydrocarbon carboxylic acids of less than 12 carbon atoms such as those previously set forth.

In accordance with the following equation, the 1,2-dimethyl-6-dehydro-estrone and 2-methyl-6-dehydro-estrone are useful as intermediates for the preparation of the corresponding 6-dehydro-estradiols and 17α-aliphatic hydrocarbon substituted-6-dehydro-estradiols.

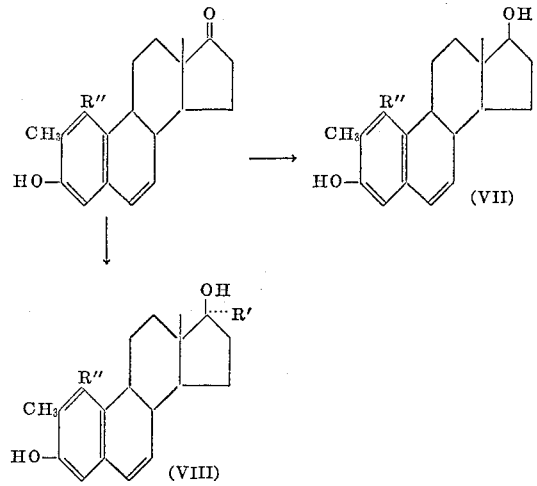

In the above formulas, R″ represents hydrogen or methyl and R′ has the same meaning as previously set forth.

For preparation of the estradiol derivatives (VII), the estrone compound is treated with a reducing agent, preferably an alkali metal hydride such as sodium borohydride in alcohol-water solution or lithium aluminum hydride in ether solution.

For production of the estradiol derivatives having a C-17α aliphatic hydrocarbon group (VIII), the estrone derivative is reacted with an aliphatic hydrocarbon magnesium halide in an inert solvent such as a hydrocarbon or an ether, for example, benzene or diethyl ether, to convert the 17-keto group into the 17β-hydroxy-17α-aliphatic hydrocarbon grouping. Thus by reaction with methyl magnesium bromide, the 17α-methyl-17β-hydroxy grouping is formed and by similar reaction with an ethyl, vinyl, ethinyl or ethoxyethinyl Grignard reagent, there is formed the 17β-hydroxy compound with the respective hydrocarbon radical at C-17α. Alternatively the 17α-alkyl group is obtained by reaction with an alkyl-metal such as ethyl-lithium by conventional methods and the alkinyl group, preferably the ethinyl group, is introduced by the reaction with potassium acetylide prepared in situ. Thus, to prepare the ethinyl derivative, 2-methyl-6-dehydro-estrone or 1,2-dimethyl-6-dehydro-estrone may be dissolved in an organic solvent such as benzene and added to a solution of potassium metal in a tertiary alcohol such as t-butyl alcohol. Acetylene is then passed into the reaction mixture for a prolonged period of time of the order of 2 days. Neutralization with acid and removal of the organic solvents by steam distillation results in a precipitate of the 17α-ethinyl product which is then purified as by crystallization.

Similarly with prior hydrogenation, the 2-methyl-6-dehydro-estrone and 1,2-dimethyl-6-dehydro-estrone can be utilized for the preparation of 2-methyl-estrone, 2-methyl-estradiol, 2-methyl-17α-aliphatic hydrocarbon-estradiol, 1,2-dimethyl-estrone, 1,2-dimethyl-estradiol and 1,2-dimethyl-17α-aliphatic hydrocarbon estradiol in accordance with the following equation:

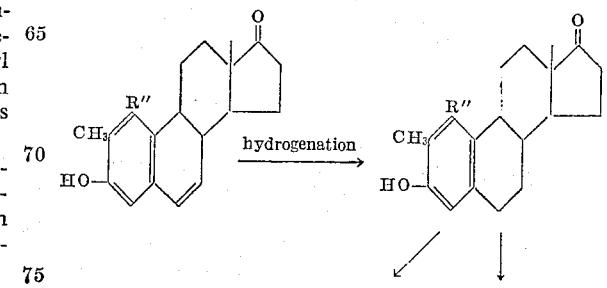

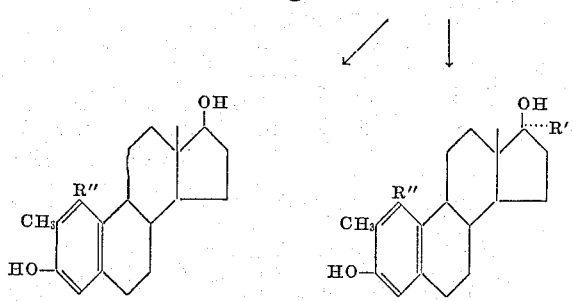

In the above formulas, R' and R" have the same meaning as set forth previously.

In practicing the process outlined above, the 2-methyl-6-dehydro-estrone or 1,2-dimethyl-6-dehydro-estrone is hydrogenated in the presence of a hydrogenation catalyst, preferably palladium or platinum, until 1 mol of hydrogen is taken up to give the corresponding 2-methyl-estrone or 1,2-dimethyl-estrone. Reaction with a reducing agent or with an aliphatic hydrocarbon Grignard reagent, alkyl lithium or potassium acetylide as previously described in connection with the 6-dehydro compounds gives the corresponding 2-methyl-estradiol, 1,2-dimethyl-estradiol and the 17α-aliphatic hydrocarbon estradiol derivatives.

By conventional esterification with carboxylic acid anhydrides or acylhalides all of the secondary hydroxyl groups in both the 6-dehydro and the corresponding 6-saturated compounds are esterified to form either mono or diesters.

The tertiary hydroxyl group at C–17β in both the 6-dehydro and 6-saturated compounds may be esterified by heating the steroid in pyridine with a carboxylic acid anhydride or by treating with the acid anhydride in benzene in the persence of p-toluenesulfonic acid at room temperature with simultaneous esterification of the free hydroxyl group at C–3. Upon mild alkaline hydrolysis of the ester group at C–3, there is formed the 17β-monoester. Reesterification of the hydroxyl group at C–3 with the same or different carboxylic acid anhydrides results in diesters having the same or different ester groups.

There is also formed the 3-ethers of the estradiols by reaction with lower alkyl sulfates in the presence of aqueous alkali metal hydroxides, preferably potassium hydroxide, which compounds exhibit reduced estrogenic activity.

Comparative studies to determine the difference in activity between the novel compounds of the present invention and the compounds lacking the methyl substituent were carried out under standard test procedures for measuring estrogenic and anti-androgenic activity. The relative activities are specified in the following table:

*Comparative relative biological activity*

| Compound | Estrogenic Activity | Anti-Androgenic Activity |
|---|---|---|
| Estrone | 1 | 1 |
| 1,2-dimethyl estrone | 1/2500 | 0.4 |
| 6-dehydro estrone | 1/150 | 0.1 |
| 1,2-dimethyl-6-dehydro-estrone | 1/1000 | 0.8 |
| Estradiol | 0.2 | 0.1 |
| 2-methyl estradiol | 1/1000 | 0.5 |
| 1,2-dimethyl estradiol | 1/500 | 0.3 |
| 17α-ethinyl-estradiol | 0.2 | 0.1 |
| 1,2-dimethyl-17α-ethinyl-estradiol | 1/2500 | 0.25 |
| 2-methyl-17α-ethyinyl-6-dehydro-estradiol | 1/5000 | 0.7 |
| 1,2-dimethyl-17α-ethinyl-6-dehydro-estradiol | 1/5000 | 0.8 |

The results expressed in the table indicate the novel compounds of the present invention exhibit decreased estrogenic activity but retain anti-androgenic activity as compared with the non-methylated compounds.

This application is a continuation-in-part of our copending applications Serial Nos. 659,470 and 659,461, filed on May 16, 1957, both now abandoned.

The following examples serve to illustrate but are not intended to limit the scope of the present invention.

*Example I*

A solution of 710 mg. (1.1 equivalents) of chromic acid in 15 cc. of 80% acetic acid was added dropwise to a stirred solution of 3.0 g. of 2α-methyl-Δ⁴-androsten-17β-ol-3-one in 30 cc. of glacial acetic acid, while the temperature was maintained below 20° C. After 2 hours standing at room temperature the mixture was poured into ice water and the precipitate was collected, well washed with water and crystallized from methanol, thus giving 2α-methyl-Δ⁴-androsten-3,17-dione.

A suspension of 2.5 g. of the above compound in 50 cc. of ether containing 3 drops of a saturated solution of hydrogen bromide in acetic acid, was slowly treated with a solution of 2.8 g. (2.1 mols) of bromine in 30 cc. of acetic acid. The resulting clear solution was kept standing for 1 hour and then concentrated under reduced pressure until crystallization. The 2,6-dibromo-2α-methyl-Δ⁴-androsten-3,17-dione produced was filtered and washed with a little ether.

3.0 g. of the 2,6-dibromo derivative was refluxed for 1 hour with 10 cc. of collidine and then cooled. The precipitate of collidine hypobromide was filtered and well washed with ether and the solution was washed with dilute hydrochloric acid, with sodium bicarbonate and water, dried and evaporated to dryness. Chromatography of the residue with 100 g. of alumina afforded the pure 2-methyl-Δ$^{1,4,6}$-androstatrien-3,17-dione.

A mixture of 1.0 g. of 2-methyl-Δ$^{1,4,6}$-androstatriene-3,17-dione, 40 cc. of acetic anhydride and 300 mg. of p-toluenesulfonic acid was heated on the steam bath under anhydrous conditions for 4 hours. The cooled mixture was poured into 500 cc. of water and kept standing overnight at room temperature. The precipitate was filtered, well washed with water, dried and crystallized from acetone-hexane, thus affording the acetate of 1,2-dimethyl-6-dehydro-estrone.

0.5 g. of the above acetate in 30 cc. of methanol was treated under nitrogen with 0.2 g. of potassium hydroxide in 2 cc. of water. The mixture was kept for 1 hour at room temperature and then acidified with acetic acid and concentrated to one third of its volume. Dilution with water and filtration of the precipitate yielded the free 1,2-dimethyl-6-dehydro-estrone which was crystallized from acetone-hexane. This compound was only about 1/1000 as estrogenic as estrone in the mouse uterus assay but shows anti-androgenic activity in chick given a standard dose of testosterone.

Conventional reaction of this compound with anhydrides and/or chlorides gave the corresponding 3-propionate, 3-benzoate, 3-cyclopentylpropionate and the 3-phenylpropionate.

*Example II*

A solution of 2.0 g. of 2-methyl-Δ$^{1,4,6}$-androstatrien-3,17-dione in 200 cc. of mineral oil was passed through a column packed with glass helices previously heated to 600°, and this temperature was maintained during the operation. The solution was diluted with hexane and passed through a chromatographic column with 300 g. of alumina. The column was well washed with hexane to completely remove the mineral oil and then is was eluted with ether. The crystalline fractions were combined and crystallized from methanol to give 2-methyl-6-dehydro-estrone.

Conventional reaction of this compound with acid anhydrides or chlorides gave the corresponding 3-propionate, 3-benzoate, 3-cyclopentylpropionate and the 3-phenylpropionate.

*Example III*

0.3 g. of 2-methyl-6-dehydro-estrone, dissolved in 20 cc. of methanol, was treated with a solution of 0.2 g.

of sodium borohydride in 3 cc. of water and kept for 3 hours at room temperature. A few drops of acetic acid was then added and the solution was diluted with salt water. The precipitate was collected, washed with water and crystallized from acetone-hexane, thus giving 2-methyl-6-dehydro-estradiol.

Conventional reaction of this compound with acid anhydrides or chlorides gave the corresponding 3,17-dipropionate, 3,17-dibenzoate, 3,17-cyclopentylpropionate and the 3,17-diphenylpropionate.

*Example IV*

A solution of 0.5 g. of 2-methyl-6-dehydro-estrone in 20 cc. of anhydrous benzene was added under an atmosphere of nitrogen to a cooled solution of 0.5 g. of potassium metal in 25 cc. of t-butyl alcohol, which had also been prepared under a stream of nitrogen. The stream of nitrogen was then substituted by a stream of dry purified acetylene and the operation was continued for 40 hours. The solution was poured into 100 cc. of dilute hydrochloric acid, the organic solvents were removed by steam distillation, the mixture was cooled and the precipitate was collected. Crystallization from chloroform-methanol yielded 2-methyl-17α-ethinyl-6-dehydro-estradiol.

Conventional reaction of this compound with acid anhydride or chloride gave the corresponding 3-propionate, 3-benzoate, 3-cyclopentylpropionate and the 3-phenylpropionate.

*Example V*

A solution of 0.5 g. of 2-methyl-6-dehydro-estrone in 25 cc. of ethyl acetate was stirred under an atmosphere of hydrogen, at room temperature and atmospheric pressure, in the presence of 100 mg. of a 10% palladium on charcoal catalyst. After the equivalent of one mol of hydrogen had been absorbed, the solution was filtered and evaporated to dryness. Crystallization from acetone-hexane afforded 2-methyl-estrone.

Conventional reaction of this compound with acid anhydrides or chlorides gave the corresponding 3-propionate, 3-benzoate, 3-cyclopentylpropionate and the 3-phenylpropionate.

0.3 g. of 2-methyl-estrone dissolved in 20 cc. of methanol was treated with a solution of sodium borohydride, as described in Example III, thus affording 2-methyl-estradiol. This compound was 1/20 to 1/50 as estrogenic as estrone but had anti-androgenic activity.

Conventional reaction of this compound with acid anhydrides or chlorides gave the corresponding 3,17-dipropionate, 3,17-dibenzoate, 3,17-cyclopentylpropionate and the 3,17-diphenylpropionate.

*Example VI*

The reaction of 2-methyl-estrone with potassium t-butylate and acetylene, in accordance with the conditions described in Example IV, produced 2-methyl-17α-ethinyl-estradiol.

Conventional reaction of this compound with acid anhydrides or chlorides gave the corresponding 3-propionate, 3-benzoate, 3-cyclopentylpropionate and 3-phenylpropionate.

*Example VII*

A solution of 0.3 g. of 1,2-dimethyl-6-dehydroestrone (cf. Example I) in 20 cc. of methanol, was treated with a solution of 0.2 g. of sodium borohydride in 3 cc. of water. After keeping the mixture for 3 hours at room temperature, it was treated with a few drops of acetic acid and diluted with salt water. The precipitate was collected, washed with water and crystallized from acetone-hexane, thus producing 1,2-dimethyl-6-estradiol.

Conventional reaction of this compound with acid anhydrides or chlorides gave the corresponding 3,17-dipropionate, 3,17-dibenzoate, 3,17-cyclopentylpropionate and the 3,17-diphenylpropionate.

*Example VIII*

A solution of 0.5 g. of 1,2-dimethyl-6-dehydroestrone in 20 cc. of anhydrous benzene was added under an atmosphere of nitrogen to a cooled solution of 0.5 g. of potassium metal in 25 cc. of t-butyl alcohol, which had been prepared under an atmosphere of nitrogen. The stream of nitrogen was then substituted by a stream of dried and purified acetylene and the operation was continued for 40 hours. The solution was poured into 100 cc. of dilute hydrochloric acid, the organic solvents were removed by steam distillation and after cooling the precipitate was collected. Crystallization from chloroform-methanol afforded 1,2-dimethyl-17α-ethinyl-6-dehydroestradiol.

Conventional reaction of this compound with said anhydrides or chlorides gave the corresponding 3-propionate, 3-benzoate, 3-cyclopentylpropionate and the 3-phenylpropionate.

*Example IX*

A solution of 500 mg. of 1,2-dimethyl-17α-ethinyl-6-dehydro-estradiol in 10 cc. of pyridine containing 100 mg. of a pre-reduced palladium on calcium carbonate catalyst was hydrogenated at room temperature until the equivalent of one mol of hydrogen had been absorbed. The catalyst was filtered, the pyridine was evaporated under reduced pressure, the residue was triturated with 20 cc. of 1% hydrochloric acid, the product was extracted with ethyl acetate and the extract was washed with water, dried over anhydrous sodium sulfate and the solvent was evaporated. Chromatography of the residue on neutral alumina yielded 1,2-dimethyl-17α-vinyl-6-dehydro-estradiol.

*Example X*

0.5 g. of 1,2-dimethyl-6-dehydro-estrone in 25 cc. of ethyl acetate was stirred under an atmosphere of hydrogen, at atmospheric pressure and room temperature, in the presence of 100 mg. of a 10% palladium on charcoal catalyst which had been previously reduced in 10 cc. of ethyl acetate. After the equivalent of 1 mol of hydrogen had been absorbed, the solution was filtered and evaporated to dryness. Crystallization from acetone-hexane yielded 1,2-dimethyl-estrone.

This compound was only about 1/1000 as estrogenic as estrone in the mouse uterus assay but shows antiandrogenic activity in chicks given a standard dose of testosterone. Further when fed to rats by the oral route it partially counteracts the injection of testosterone. The compound also moderately suppresses the sebaceous gland.

Conventional reaction of this compound with acid anhydrides or chlorides gave the corresponding propionate, benzoate, cyclopentylpropionate and phenylpropionate.

*Example XI*

0.3 g. of 1,2-dimethyl-estrone in 20 cc. of methanol was treated with a solution of 0.2 g. of sodium borohydride in 3 cc. of water. After 3 hours at room temperature the mixture was treated with a few drops of acetic acid and diluted with water. The precipitate was filtered, washed with water and crystallized from acetone-hexane giving 1,2-dimethyl-estradiol. This compound was 1/200 as estrogenic as estrone in the mouse uterus assay.

*Example XII*

A solution of 0.5 g. of 1,2-dimethyl-estrone in 20 cc. of anhydrous benzene was added under an atmosphere of nitrogen to a cooled solution of 0.5 g. of potassium metal in 25 cc. of t-butyl-alcohol which had also been prepared under an atmosphere of nitrogen. The stream of nitrogen was then substituted by a stream of dried and purified acetylene and the operation was continued for 40 hours. The solution was poured into 100 cc. of dilute hydrochloric acid, the organic solvents were removed by steam distillation and the precipitate was filtered from the cooled mixture. Crystallization from chloroform-methanol produced 1,2-dimethyl-17α-ethinyl-estradiol.

Conventional reaction of this compound with acid anhydrides or chlorides gave the corresponding 3-propionate, 3-benzoate, 3-cyclopentylpropionate and the 3-phenylpropionate.

*Example XIII*

To a Grignard reagent prepared from 600 mg. of magnesium, 3.9 g. of methyl iodide and 30 cc. of absolute ether there was added 1.5 g. of 1,2-dimethyl-estrone acetate dissolved in 50 cc. of anhydrous toluene and the mixture was stirred at room temperature under an atmosphere of nitrogen for half an hour and then refluxed for 3 hours. The mixture was kept overnight at room temperature and the Grignard complex was then decomposed with 2% ammonium chloride solution containing a small amount of hydrochloric acid. The organic material was extracted with ether and the residue from the extract was treated twice with Girard T reagent. Recrystallization of the non-ketonic fraction, first from aqueous acetone and then from acetone-hexane, yielded 1,2,17α-trimethyl-estradiol.

A mixture of 500 mg. of the above compound, 0.5 cc. of acetic anhydride and 10 cc. of pyridine was kept standing overnight, then diluted with water and the precipitate was collected by filtration, washed with water, dried and recrystallized from acetone-hexane, thus furnishing the 3-acetate of 1,2,17α-trimethyl-estradiol.

*Example XIV*

To 2 g. of 1,2-dimethyl-estrone in 250 cc. of absolute ether was slowly added a solution of 10 molar equivalents of ethyl-lithium in 50 cc. of ether, with continuous stirring and under an atmosphere of nitrogen. The mixture was then stirred for 48 hours at room temperature under an atmosphere of nitrogen, poured into ice water and the mixture was acidified with hydrochloric acid while stirring vigorously. The ether layer was separated, washed with water to neutral, dried over anhydrous sodium sulfate, filtered and the ether was evaporated from the filtrate. Recrystallization of the residue from acetone-hexane afforded 1,2-dimethyl-17α-ethyl-estradiol.

A mixture of 1 g. of the above compound, 5 cc. of acetic anhydride, 25 cc. of acetic acid and 1 g. of p-toluenesulfonic acid was stirred overnight at room temperature. After pouring into ice water the precipitate was collected, washed with water, dried and recrystallized from acetone-hexane, to produce the diacetate of 1,2-dimethyl-17α-ethyl-estradiol.

*Example XV*

By applying the reaction with ethyl-lithium described in the preceding example, to 1,2-dimethyl-6-dehydroestrone, there was obtained 1,2-dimethyl-17α-ethyl-6-dehydro-estradiol.

*Example XVI*

To 5 cc. of a 3 N solution of methyl magnesium bromide in ether was added 1 g. of 1,2-dimethyl-6-dehydro-estrone dissolved in 20 cc. of anhydrous benzene and the mixture was refluxed for 12 hours under anhydrous conditions. It was then poured into 2% aqueous ammonium chloride solution with vigorous stirring and the organic layer was separated, washed with water, dried over anhydrous sodium sulfate and the residue was purified by chromatography on neutral alumina, thus yielding 1,2,17α-trimethyl-6-dehydro-estradiol, which was converted into its 3-acetate by the methods described in Example XIII.

A solution of 500 mg. of the above compound in 30 cc. of benzene was treated with 1 g. of cyclopentylpropionic anhydride and 200 mg. of p-toluenesulfonic acid; the mixture was kept at room temperature for 48 hours and the solvent was then evaporated by chromatography of the residue on neutral alumina and recrystallization of the solid eluates from acetone-hexane; there was obtained the 3-acetate-17-cyclopentylpropionate of 1,2,17α-trimethyl-6-dehydro-estradiol.

200 mg. of the above compound was treated with 10 cc. of methanolic potassium hydroxide solution and stirred for 2 hours at 10° C. The mixture was acidified with dilute hydrochloric acid, the product was extracted with ethyl acetate and the extract was washed with water, dried over anhydrous sodium sulfate and evaporated to dryness. Recrystallization of the residue from acetone-hexane furnished the 17-cyclopentylpropionate of 1,2,17α-trimethyl-6-dehydro-estradiol.

*Example XVII*

In accordance with the method described in Example XVI, but substituting the methyl magnesium bromide by vinyl magnesium bromide, 1,2-dimethyl-6-dehydroestrone was converted into 1,2-dimethyl-17α-vinyl-6-dehydro-estradiol, identical with the final compound of Example IX.

1 g. of the above compound was dissolved in 100 cc. of 3% of sodium hydroxide solution and then benzoyl chloride was added dropwise with continuous stirring until the mixture gave an acid reaction. The product was extracted with ether, the extract was washed with water, dried over anhydrous sodium sulfate and the ether was evaporated. Recrystallization of the residue from acetone-hexane furnished the 3-benzoate of 1,2-dimethyl-17α-vinyl-6-dehydro-estradiol.

*Example XVIII*

A solution was prepared of 360 mg. of magnesium and 1.6 g. of ethyl bromide in 35 cc. of ether and in the course of half an hour there was added under continuous stirring a solution of 1 g. of the ethoxyacetylene in 20 cc. of ether and the mixture was stirred for 1 hour further. There was thus obtained an ether solution of ethoxyethinyl magnesium bromide which was treated with a solution of 1 g. of 1,2-dimethyl-estrone in 10 cc. of benzene; after refluxing for one hour the mixture was poured into 50 cc. of 2% aqueous ammonium chloride solution, acidified with hydrochloric acid while stirring vigorously, and the organic layer was separated, washed with water, dried over anhydrous sodium sulfate and the solvent was evaporated. Chromatography of the residue on neutral alumina yielded 1,2-dimethyl-17α-ethoxyethinyl-estradiol.

*Example XIX*

To a refluxing solution of 2 g. of 1,2-dimethyl-17α-ethyl-estradiol in 50 cc. of ethanol was added 16 cc. of 10% aqueous potassium hydroxide solution and 16 cc. of dimethyl sulfate, in 4 alternate portions over a period of 10 minutes. The mixture was heated for 10 minutes more on the steam bath, cooled, acidified with dilute hydrochloric acid and the precipitate was collected by filtration, washed with water, dried and recrystallized from acetone-hexane, thus giving the 3-methyl-ether of 1,2-dimethyl-17α-ethyl-estradiol.

By subsequent acetylation, by following the method described in Example XIV, there was then obtained the acetate of the 3-methyl-ether of 1,2-dimethyl-17α-ethyl-estradiol.

*Example XX*

By substituting the 1,2-dimethyl-estrone by 2-methyl estrone in the method of Examples XIII and XIV, there were obtained the corresponding 2,17α-dimethyl-estradiol, the 3-acetate of 2,17α-dimethyl-estradiol, 2-methyl-17α-ethyl-estradiol and the diacetate of 2-methyl-17α-ethyl-estradiol.

*Example XXI*

By substituting the 1,2-dimethyl-6-dehydro-estrone by 2-methyl-6-dehydro estrone in the methods of Examples XV, XVI, and XVII, there were obtained the corresponding products lacking the methyl group at C-1.

We claim:
1. A compound of the following formula:

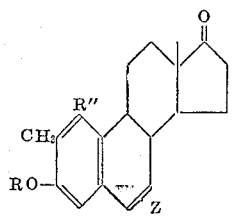

wherein R" is selected from the group consisting of hydrogen and methyl; R is selected from the group consisting of hydrogen and a hydrocarbon carboxylic acyl group containing less than 12 carbon atoms and Z is selected from the group consisting of a double bond between C–6 and C–7 and a saturated linkage between C–6 and C–7.
2. 2-methyl-estrone.
3. 2-methyl-6-dehydro-estrone.
4. 1,2-dimethyl-estrone.
5. 1,2-dimethyl-6-dehydro-estrone.
6. A compound of the following formula:

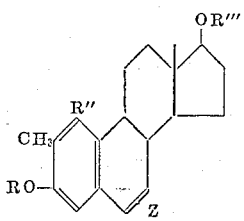

wherein R and R''' are selected from the group consisting of hydrogen and a hydrocarbon carboxylic acyl group containing less than 12 carbon atoms; R" is selected from the group consisting of hydrogen and methyl; and Z is selected from the group consisting of a double bond between C–6 and C–7 and a saturated linkage between C–6 and C–7.
7. 2-methyl-estradiol.
8. 2-methyl-6-dehydro-estradiol.
9. 1,2-dimethyl-estradiol.
10. 1,2-dimethyl-6-dehydro-estradiol.

11. A compound of the following formula:

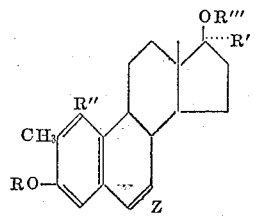

wherein R and R''' are selected from the group consisting of hydrogen and a hydrocarbon carboxylic acyl group containing less than 12 carbon atoms; R' is an aliphatic hydrocarbon group containing up to 9 carbon atoms; R" is selected from the group consisting of hydrogen and methyl; and Z is selected from the group consisting of a double bond between C–6 and C–7 and a saturated linkage between C–6 and C–7.
12. 2,17α-dimethyl-estradiol.
13. 1,2,17α-trimethyl-estradiol.
14. 2,17α-dimethyl-6-dehydro-estradiol.
15. 1,2,17α-trimethyl-6-dehydro-estradiol.
16. 2-methyl-17α-ethinyl-estradiol.
17. 2-methyl-17α-ethinyl-6-dehydro-estradiol.
18. 1,2-dimethyl-17α-ethinyl-estradiol.
19. 1,2-dimethyl-17α-ethinyl-6-dehydro-estradiol.
20. In a process for the production of a compound selected from the group consisting of 1,2-dimethyl-6-dehydro-estrone, 1,2-dimethyl-6-dehydro-estradiol, 1,2-dimethyl-estrone and 1,2-dimethyl-estradiol, the steps comprising treating 2α-methyl-Δ⁴-androsten-17β-ol-3-one with a chromic acid oxidizing agent to form 2α-methyl-Δ⁴-androstene-3,17-dione, treating the dione with approximately 2 mols of bromine to form the corresponding 2,6-dibromo compound, treating the dibromo compound with collidine to form the corresponding $\Delta^{1,4,6}$-triene derivative, and rearranging the triene with acetic anhydride and p-toluenesulfonic acid to form 1,2-dimethyl-6-dehydro-estrone.

References Cited in the file of this patent
UNITED STATES PATENTS

| 2,705,237 | Djerassi et al. | Mar. 29, 1955 |
| 2,723,280 | Inhoffen | Nov. 8, 1955 |
| 2,791,592 | Djerassi et al. | May 7, 1957 |

OTHER REFERENCES

Haack et al.: "Naturwessenschaften" vol. 41 (1954) page 429 relied on. CA. vol. 50, par. 395a.